US008205903B2

(12) United States Patent
Simard et al.

(10) Patent No.: US 8,205,903 B2
(45) Date of Patent: Jun. 26, 2012

(54) ADJUSTABLE HANDLEBAR FOR A VEHICLE

(75) Inventors: Richard Simard, St-Charles-de-Drummond (CA); Etienne Girard, Sherbrooke (CA); Andre Denis, Sherbooke (CA); Andre Cote, Longueuil (CA); Steve Tetreault, Sherbrooke (CA)

(73) Assignee: Bombardier Recreational Products Inc., Valcourt, CA (US)

( * ) Notice: Subject to any disclaimer, the term of this patent is extended or adjusted under 35 U.S.C. 154(b) by 382 days.

(21) Appl. No.: 12/494,899

(22) Filed: Jun. 30, 2009

(65) Prior Publication Data
US 2010/0327552 A1 Dec. 30, 2010

(51) Int. Cl.
*B62K 11/14* (2006.01)
*B62K 21/16* (2006.01)

(52) U.S. Cl. ....... 280/287; 280/278; 74/551.3; 74/551.4
(58) Field of Classification Search ............ 280/278, 280/287; 74/551.3, 551.4, 551.5
See application file for complete search history.

(56) References Cited

U.S. PATENT DOCUMENTS

| 3,505,901 A * | 4/1970 | Stone ............... 74/551.4 |
| 3,903,980 A * | 9/1975 | Darras .............. 180/222 |
| 4,458,115 A * | 7/1984 | Peterson ............ 200/61.85 |
| 4,901,595 A * | 2/1990 | Ozaki et al. ........ 74/502.2 |
| 4,938,733 A * | 7/1990 | Patterson .......... 474/80 |
| 4,966,047 A * | 10/1990 | Krauer et al. ...... 74/502.2 |
| 5,005,674 A * | 4/1991 | Piatt .............. 188/24.11 |
| 5,370,017 A * | 12/1994 | Krauer ............. 74/502.2 |
| 5,373,757 A | 12/1994 | Bigall |
| 5,404,769 A | 4/1995 | Kao |
| 5,685,201 A * | 11/1997 | Renshaw ........... 74/551.2 |

(Continued)

FOREIGN PATENT DOCUMENTS
CA 2494292 A1 1/2005
(Continued)

OTHER PUBLICATIONS

Helibars Adjustable Handlebar Adjustable Points Photo, HOTBIKE, [online], [retrieved on Jul. 13, 2010]. Retrieved from the Internet: <URL:http://www.hotbikeweb.com/tech/0905_hbkp_helibars_horizon_adjustable_handlebar/photo_02.html>.

(Continued)

*Primary Examiner* — Joanne Silbermann
*Assistant Examiner* — Daniel Yeagley
(74) *Attorney, Agent, or Firm* — Osler, Hoskin & Harcourt LLP

(57) ABSTRACT

Each side of an adjustable handlebar assembly has a hand grip assembly receiving portion having one of an elongated hollow member and an elongated member, a hand grip assembly and at least one releasable fastener. The hand grip assembly has the other of the elongated hollow member and the elongated member, and a hand grip disposed on the other of the elongated hollow member and the elongated member. The at least one releasable fastener is disposed on one of the elongated hollow member and the elongated member. The elongated member is received coaxially in the elongated hollow member. The hand grip is axially movable and pivotable relative to the hand grip assembly receiving portion. The at least one releasable fastener is operative to selectively and releasably fix the elongated member relative to the elongated hollow member.

22 Claims, 14 Drawing Sheets

U.S. PATENT DOCUMENTS

| | | | |
|---|---|---|---|
| 5,737,967 A * | 4/1998 | Hartley | 74/551.3 |
| 5,941,125 A * | 8/1999 | Watarai et al. | 74/473.14 |
| 6,263,759 B1 * | 7/2001 | Hollingsworth et al. | 74/551.9 |
| 6,860,500 B2 | 3/2005 | Hissam | |
| 7,013,751 B2 * | 3/2006 | Hilsky et al. | 74/551.9 |
| 7,179,200 B1 * | 2/2007 | Wu | 482/51 |
| 7,204,169 B2 * | 4/2007 | Mitchell | 74/489 |
| 8,029,011 B2 * | 10/2011 | King et al. | 280/279 |
| 2006/0162483 A1 | 7/2006 | Bowers | |
| 2010/0269624 A1 * | 10/2010 | Price et al. | 74/551.8 |

FOREIGN PATENT DOCUMENTS

| | | |
|---|---|---|
| DE | 2931826 A * | 2/1981 |
| EP | 750557 A1 | 9/1995 |
| WO | 2010025619 A1 | 3/2010 |

OTHER PUBLICATIONS http://www.shoprans.com/Handlebars.asp.
http://www.convertibars.com/HowitWorks.cfm.
www.fasstco.com/products/flexx.shtml.

* cited by examiner

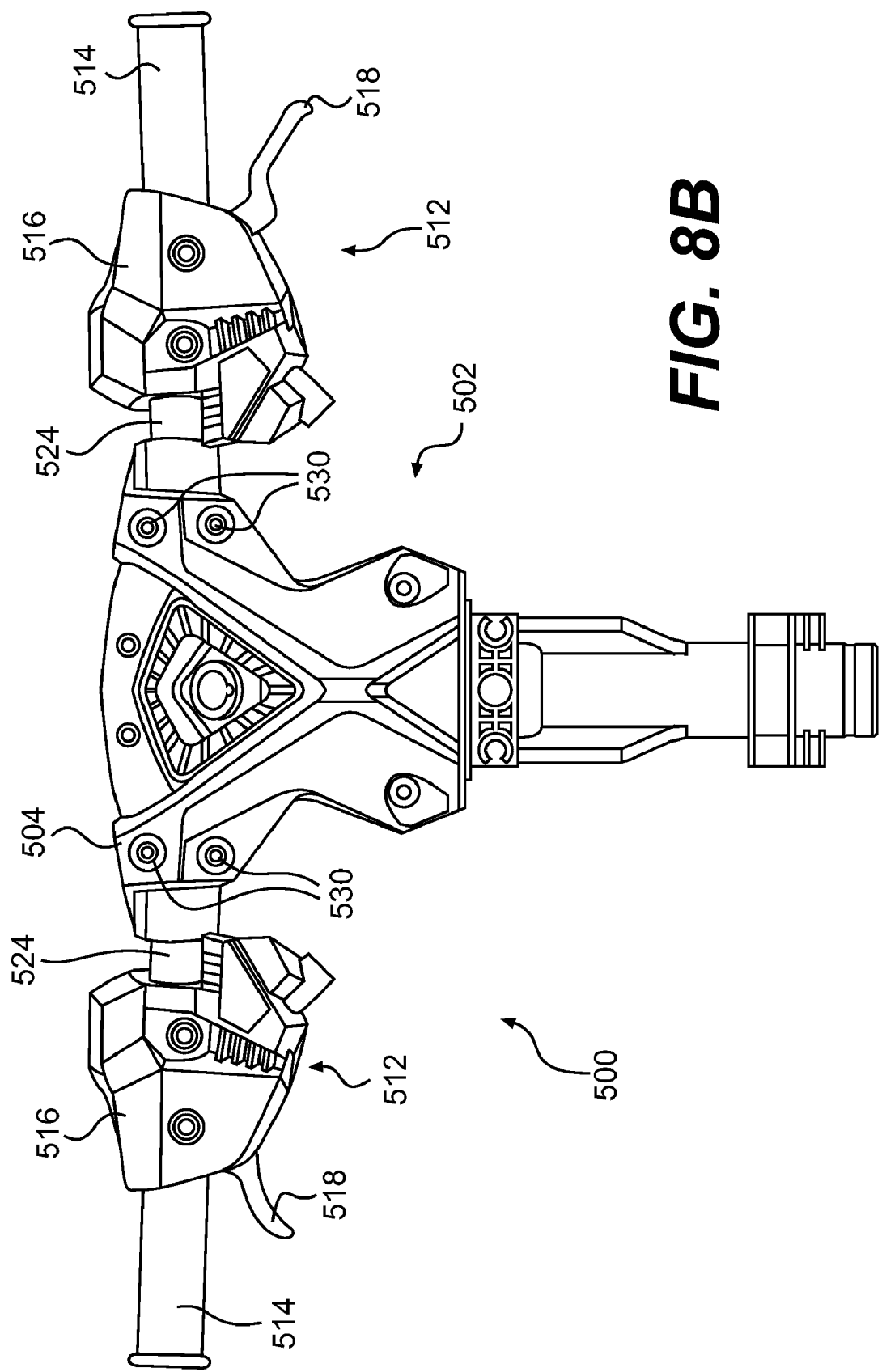

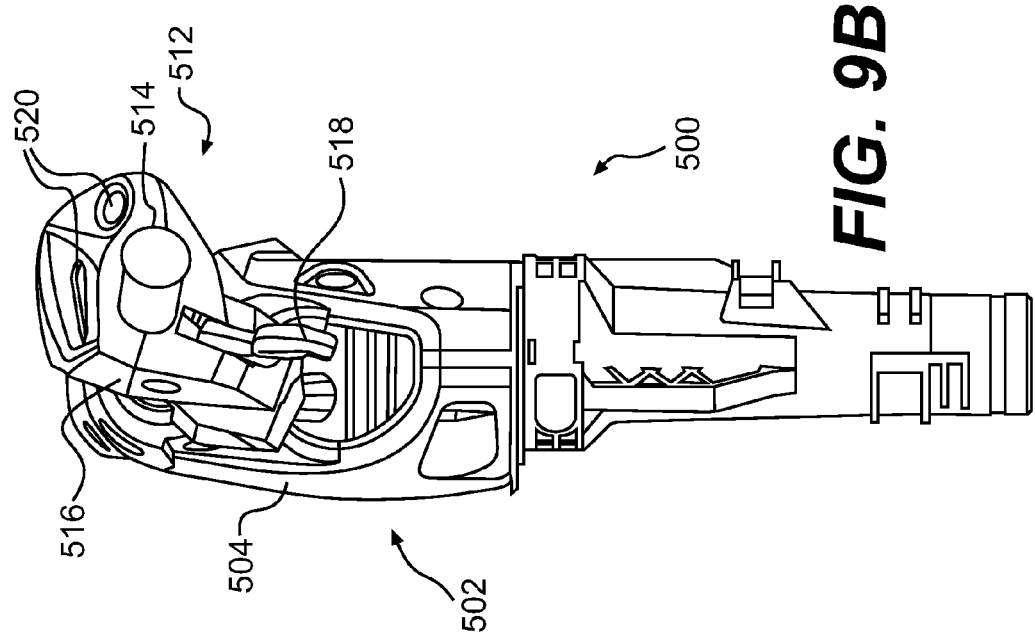
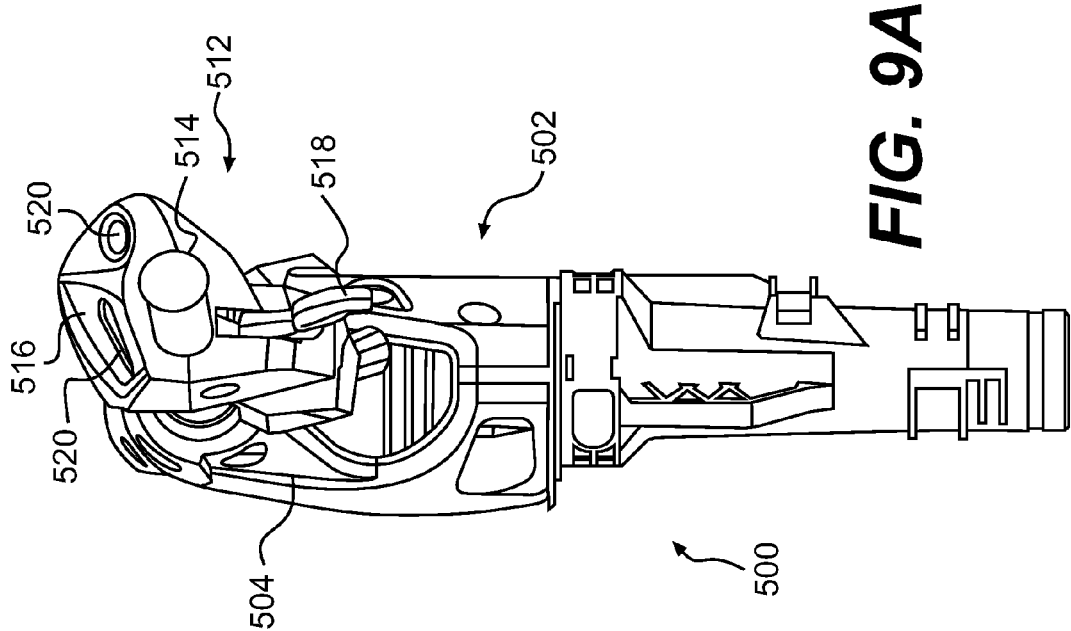

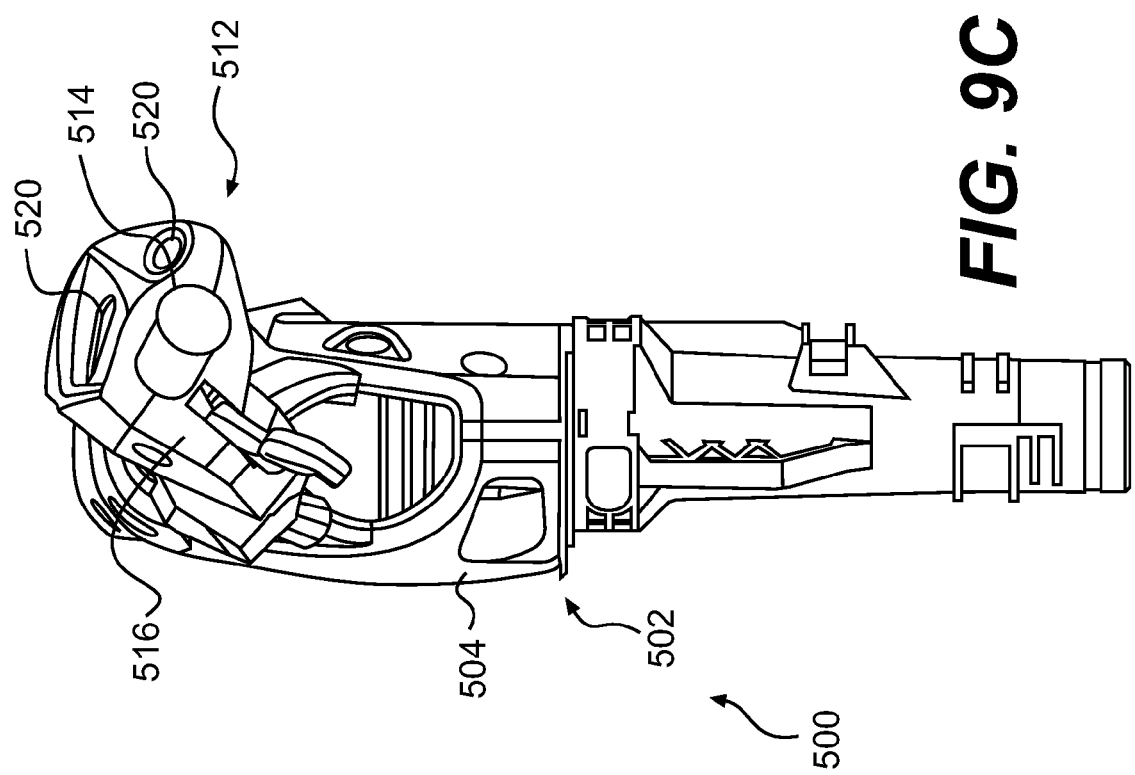

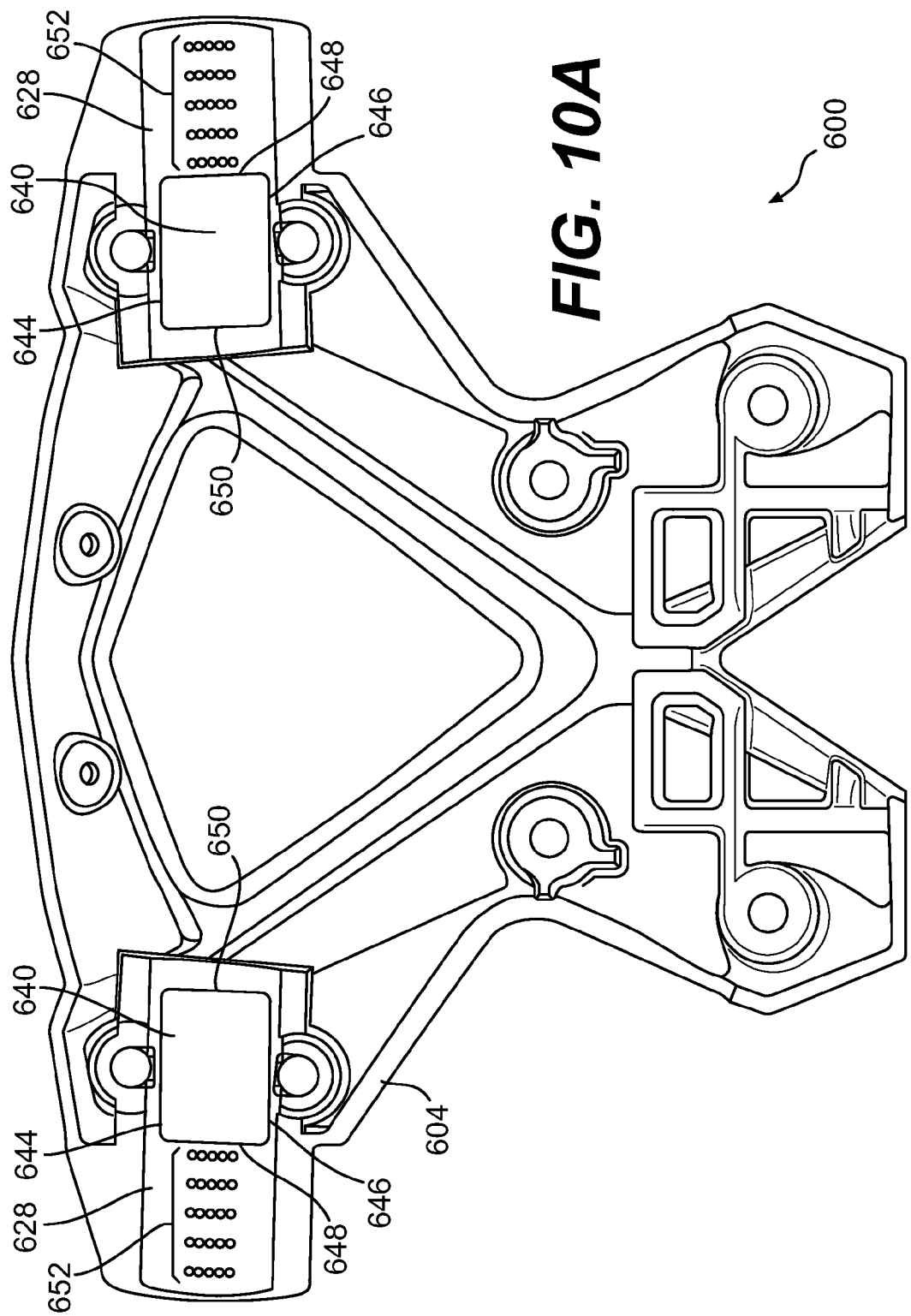

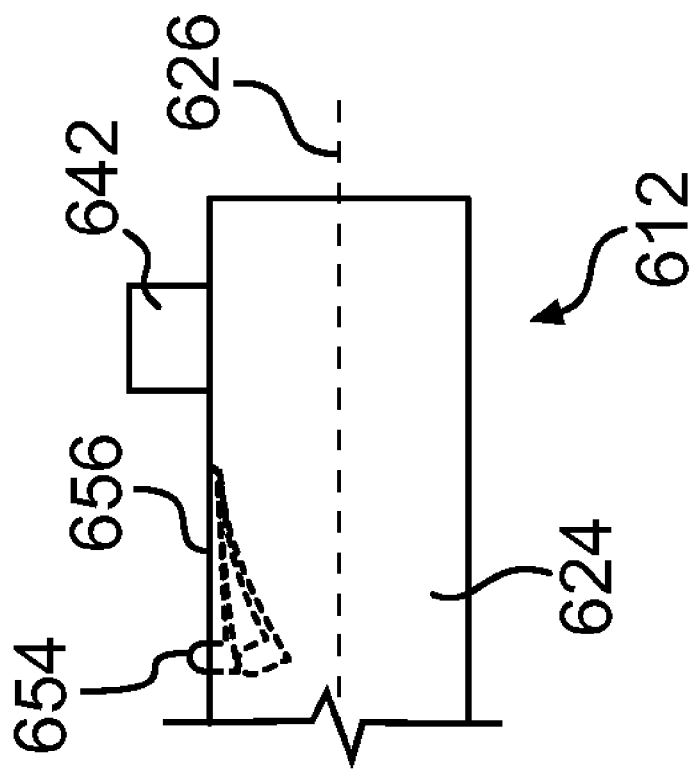

ADJUSTABLE HANDLEBAR FOR A VEHICLE

FIELD OF THE INVENTION

The present invention relates to an adjustable handlebar for a vehicle.

BACKGROUND OF THE INVENTION

Straddle-type vehicles, such as motorcycles, all-terrain vehicles (ATVs), personal watercraft, and three-wheeled road vehicles, are usually steered by a handlebar. Referring to FIG. 1, an exemplary prior art handlebar 10 is mounted to a vehicle (not shown) by clamping a clamp bar 14 portion of the handlebar 10 to a steering column 12 of the vehicle. The handlebar 10 is positioned forwardly of a straddle seat of the vehicle, and has left and right hand grips 16 on which the driver places his hands to steer the vehicle. The hand grips 16 are oriented generally transversely to the direction of travel of the vehicle, and may be angled rearwardly and either upwardly or downwardly to ensure that the hand grips 16 can be comfortably gripped by a typical driver, for example a $50^{th}$ percentile adult male. The position of the hand grips 16 relative to the seat may be adjusted by pivoting the handlebar 10 about a horizontal clamp bar axis 18 coaxial with the clamp bar 14, to accommodate riders of different heights or arm lengths, or in different riding positions.

This type of handlebar has a number of drawbacks. While the position of the handlebar 10 is adjustable about the clamp bar axis 18, adjusting the position in this manner varies the position of the hand grips 16 both vertically and forwardly/rearwardly at the same time. Therefore, it offers only one degree of freedom for drivers who may wish to adjust more than one parameter independently, and the lateral separation of the hand grips is not adjustable at all. In addition, pivoting the handlebar 10 about the clamp bar axis 18 changes the orientation of the hand grips 16, which may result in poor ergonomics which are uncomfortable for the driver, particularly on longer trips.

This drawback is exacerbated when vehicle controls for controlling an operation of the vehicle, such as a throttle actuator, a brake lever, and/or various switches and buttons, are provided on the handlebar. These controls are typically situated within reach of a driver so that the driver can conveniently reach and actuate them while maintaining a grip on the hand grips to control the vehicle. Pivoting the handlebar 10 about the clamp bar axis 16 may significantly change the orientation of the controls, making them inconvenient or even inoperable for some drivers at some angles.

One attempt to address these problems is to provide additional degrees of freedom in adjusting the handlebar, such as an adjustable height riser supporting the handlebar on the steering column. However, an adjustable height riser does not completely address all of the drawbacks described above, and it is believed that further ergonomic improvements are possible.

In addition, providing additional degrees of freedom is generally at odds with the need for a structurally rigid steering assembly to withstand the stresses that are exerted while using the vehicle, particularly in racing and other high-structural stress applications. In general, a single piece or solidly welded handlebar is preferred when maximum structural rigidity is desired.

Therefore, there is a need for an adjustable steering assembly having more than one degree of freedom of adjustment.

SUMMARY OF THE INVENTION

It is an object of the present invention to ameliorate at least some of the inconveniences present in the prior art.

It is also an object of the present invention to provide a handlebar assembly having hand grips which are adjustable axially and radially.

It is another object of the present invention to provide a vehicle having the above handlebar assembly.

In one aspect, the invention provides a vehicle having a vehicle body, a straddle-type seat disposed on the vehicle body, and a steering device supported by the vehicle body and being disposed generally forwardly of the seat for steering the vehicle. The steering device has a left side and a right side. Each side has a hand grip assembly receiving portion having one of an elongated hollow member and an elongated member, a hand grip assembly and at least one releasable fastener. The hand grip assembly has the other of the elongated hollow member and the elongated member, and a hand grip disposed on the other of the elongated hollow member and the elongated member. The at least one releasable fastener is disposed on one of the elongated hollow member and the elongated member. The elongated member is received coaxially in the elongated hollow member. A common central longitudinal axis of the elongated member and the elongated hollow member is oriented generally horizontally when the vehicle is upright, stationary and steered straight. The hand grip is axially movable relative to the hand grip assembly receiving portion along the central longitudinal axis by moving the elongated member axially relative to the elongated hollow member along the central longitudinal axis between a plurality of axial positions. The hand grip is pivotable relative to the hand grip assembly receiving portion about the central longitudinal axis by pivoting the elongated member relative to the elongated hollow member about the central longitudinal axis between a plurality of orientations. The at least one releasable fastener is operative to selectively and releasably fix the elongated member relative to the elongated hollow member in any one of the plurality of axial positions and in any one of the plurality of orientations.

In an additional aspect, the elongated hollow member is a generally cylindrical aperture, and the elongated member is a generally cylindrical member.

In a further aspect, the at least one releasable fastener comprises at least one threaded fastener. Tightening the at least one threaded fastener urges at least a portion of the generally cylindrical aperture against the generally cylindrical member, thereby preventing both axial movement and pivotal movement of the generally cylindrical member relative to the generally cylindrical aperture.

In an additional aspect, the plurality of axial positions is a plurality of predetermined axial positions, and the plurality of orientations is a plurality of predetermined orientations.

In a further aspect, one of the generally cylindrical member and the generally cylindrical aperture further comprises at least one protrusion, and the other of the generally cylindrical member and the generally cylindrical aperture further comprises a plurality of recesses. Each recess of the plurality of recesses corresponds to one of the plurality of predetermined axial positions and one of the plurality of predetermined orientations of the generally cylindrical member relative to the generally cylindrical aperture, such that when the at least one protrusion is received in at least one recess of the plurality of depressions the generally cylindrical member is in the predetermined axial position and the predetermined orientation corresponding to the at least one recess.

In an additional aspect, the at least one protrusion is movable relative to the one of the generally cylindrical member and the generally cylindrical aperture between a first position wherein the at least one protrusion is received in the at least one recess and a second position wherein the at least one protrusion is disengaged from the at least one recess. The at least one protrusion is biased toward the first position.

In a further aspect, a release actuator operatively is connected to the at least one protrusion. The release actuator is operative to selectively move the at least one protrusion to the second position.

In an additional aspect, a distal end portion of the generally cylindrical member has a diameter larger than the generally cylindrical aperture, thereby limiting an axial movement of the generally cylindrical member relative to the generally cylindrical aperture in a laterally outward direction.

In a further aspect, the steering device is further pivotably connected to the vehicle body about a horizontal axis. The horizontal axis is disposed below the left and right hand grip assemblies when the vehicle is upright, stationary and steered straight.

In an additional aspect, one of the generally cylindrical member and the generally cylindrical aperture has an annular channel formed therein. The annular channel has a first end and a second end defining a length of the channel therebetween. The other of the generally cylindrical member and the generally cylindrical aperture has a radial protrusion. The radial protrusion is received in the annular channel. The radial protrusion abuts against the first and second ends of the annular channel to define respective minimal and maximal orientations of the generally cylindrical member relative to the generally cylindrical aperture about the central longitudinal axis.

In a further aspect, the length of the channel is selected such that an angular difference between the minimal and maximal orientations of the generally cylindrical member relative to the generally cylindrical aperture generally corresponds to a maximum angle of rotation of the steering device relative to the vehicle body about the horizontal axis.

In an additional aspect, at least one hand grip assembly of the left and right hand grip assemblies comprises at least one controller disposed thereon. The at least one controller is operatively connected to the vehicle for controlling an operation of the vehicle. The at least one controller is axially movable and pivotable with the at least one hand grip relative to the hand grip assembly receiving portion.

In another aspect, the invention provides an adjustable handlebar assembly having a left side and a right side. Each side has a hand grip assembly receiving portion having one of an elongated hollow member and an elongated member, a hand grip assembly and at least one releasable fastener. The hand grip assembly has the other of the elongated hollow member and the elongated member, and a hand grip disposed on the other of the elongated hollow member and the elongated member. The at least one releasable fastener is disposed on one of the elongated hollow member and the elongated member. The elongated member is received coaxially in the elongated hollow member. A common central longitudinal axis of the elongated member and the elongated hollow member is generally coaxial with an axis of the hand grip assembly. The hand grip is axially movable relative to the hand grip assembly receiving portion along the central longitudinal axis by moving the elongated member axially relative to the elongated hollow member along the central longitudinal axis between a plurality of axial positions. The hand grip is pivotable relative to the hand grip assembly receiving portion about the central longitudinal axis by pivoting the elongated member relative to the elongated hollow member about the central longitudinal axis between a plurality of orientations. The at least one releasable fastener is operative to selectively and releasably fix the elongated member relative to the elongated hollow member in any one of the plurality of axial positions and in any one of the plurality of orientations.

In a further aspect, the elongated hollow member is a generally cylindrical aperture and the elongated member is a generally cylindrical member.

In an additional aspect, the at least one releasable fastener comprises at least one threaded fastener. Tightening the at least one threaded fastener urges at least a portion of the generally cylindrical aperture against the generally cylindrical member, thereby preventing both axial movement and pivotal movement of the generally cylindrical member relative to the generally cylindrical aperture.

In a further aspect, the plurality of axial positions is a plurality of predetermined axial positions, and the plurality of orientations is a plurality of predetermined orientations.

In an additional aspect, one of the generally cylindrical member and the generally cylindrical aperture further comprises at least one protrusion, and the other of the generally cylindrical member and the generally cylindrical aperture further comprises a plurality of recesses. Each recess of the plurality of recesses corresponds to one of the plurality of predetermined axial positions and one of the plurality of predetermined orientations of the generally cylindrical member relative to the generally cylindrical aperture, such that when the at least one protrusion is received in at least one recess of the plurality of depressions the generally cylindrical member is in the predetermined axial position and the predetermined orientation corresponding to the at least one recess.

In a further aspect, the at least one protrusion is movable relative to the one of the generally cylindrical member and the generally cylindrical aperture between a first position wherein the at least one protrusion is received in the at least one recess and a second position wherein the at least one protrusion is disengaged from the at least one recess. The at least one protrusion is biased toward the first position.

In an additional aspect, a release actuator is operatively connected to the at least one protrusion. The release actuator is operative to selectively move the at least one protrusion to the second position.

In a further aspect, a distal end portion of the generally cylindrical member has a diameter larger than the generally cylindrical aperture, thereby limiting an axial movement of the generally cylindrical member relative to the generally cylindrical aperture in a laterally outward direction.

In an additional aspect, one of the generally cylindrical member and the generally cylindrical aperture has an annular channel formed therein. The annular channel has a first end and a second end defining a length of the channel therebetween. The other of the generally cylindrical member and the generally cylindrical aperture has a radial protrusion. The radial protrusion is received in the annular channel. The radial protrusion abuts against the first and second ends of the annular channel to define respective minimal and maximal orientations of the generally cylindrical member relative to the generally cylindrical aperture about the central longitudinal axis.

In a further aspect, at least one hand grip assembly of the left and right hand grip assemblies comprises at least one controller disposed thereon. The at least one controller is operatively connectable to a vehicle for controlling an operation of the vehicle. The at least one controller is axially movable and pivotable with the at least one hand grip relative to the hand grip assembly receiving portion.

For the purposes of this application, directional terms such as forward, rearward, left, and right, in reference to a vehicle or a part of a vehicle, are as they would be understood by a driver driving the vehicle in a normal driving position.

For the purposes of this application, when relative movement or rotation between two objects is described, it should be understood that either of the two objects could be held stationary while the other undergoes the movement or rotation with respect to it.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIGS. 8A and 8B are front elevation views of the steering assembly of FIG. 6, with the hand grip portions shown in different axial positions;

FIGS. 9A-9C are left side elevation views of the steering assembly of FIG. 6, with the hand grip portions shown in different angular orientations;

FIG. 10A is a cross-sectional view of a hub according to a second embodiment;

FIG. 10B is a partial side view of hand grip portion according to the second embodiment.

DETAILED DESCRIPTION OF THE PREFERRED EMBODIMENTS

A handlebar according to the present invention could be used on many types of vehicles. Some examples of vehicles on which such a handlebar could be used, namely a snowmobile, a personal watercraft, an ATV, and a three-wheeled motorized vehicle, will be described below. However it should be understood that such a handlebar could be used on other types of vehicles, such as a motorcycle for example.

Figure 1:
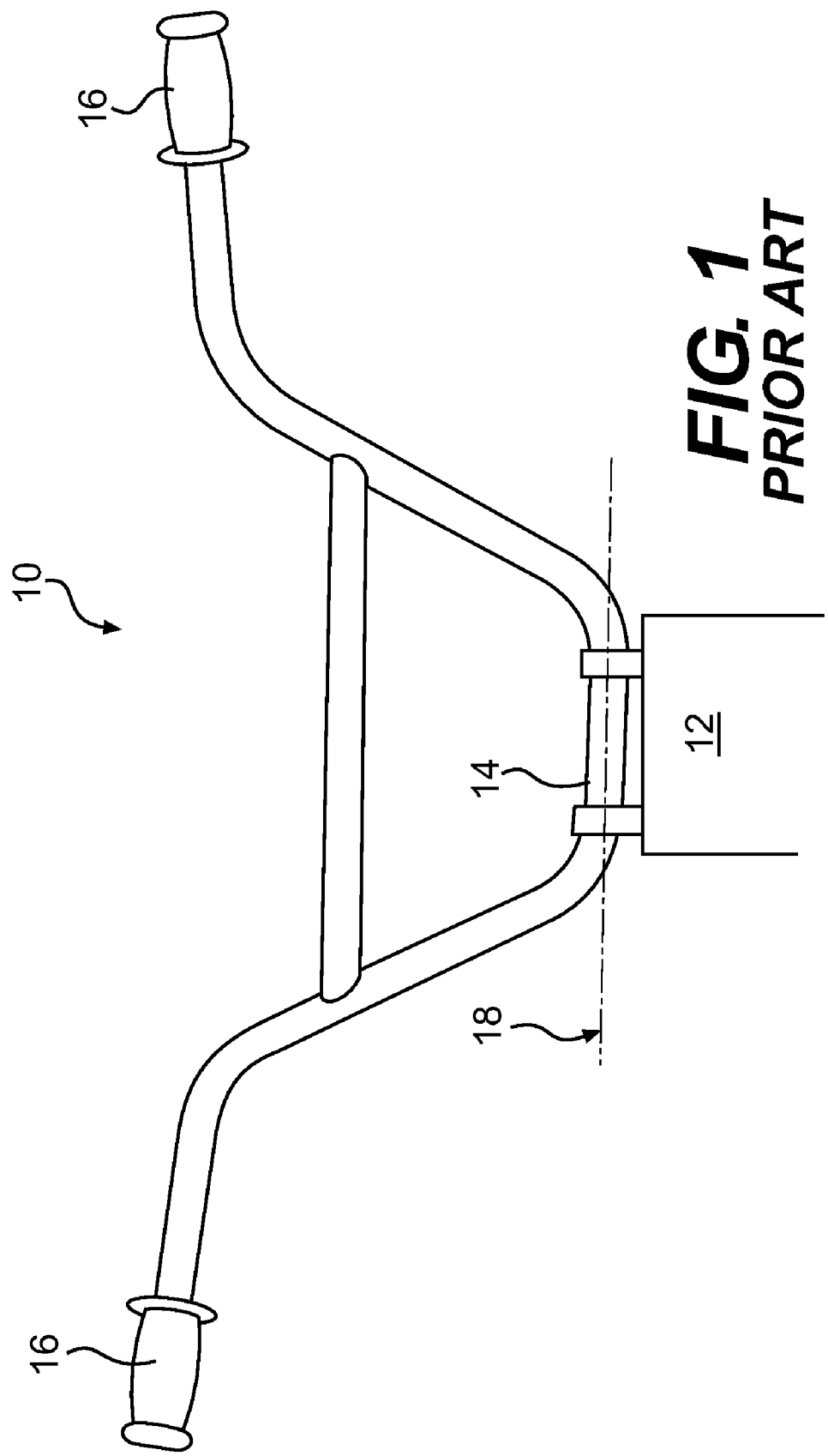
FIG. 1 is a rear elevation view of a prior art handlebar.
Figure 2:
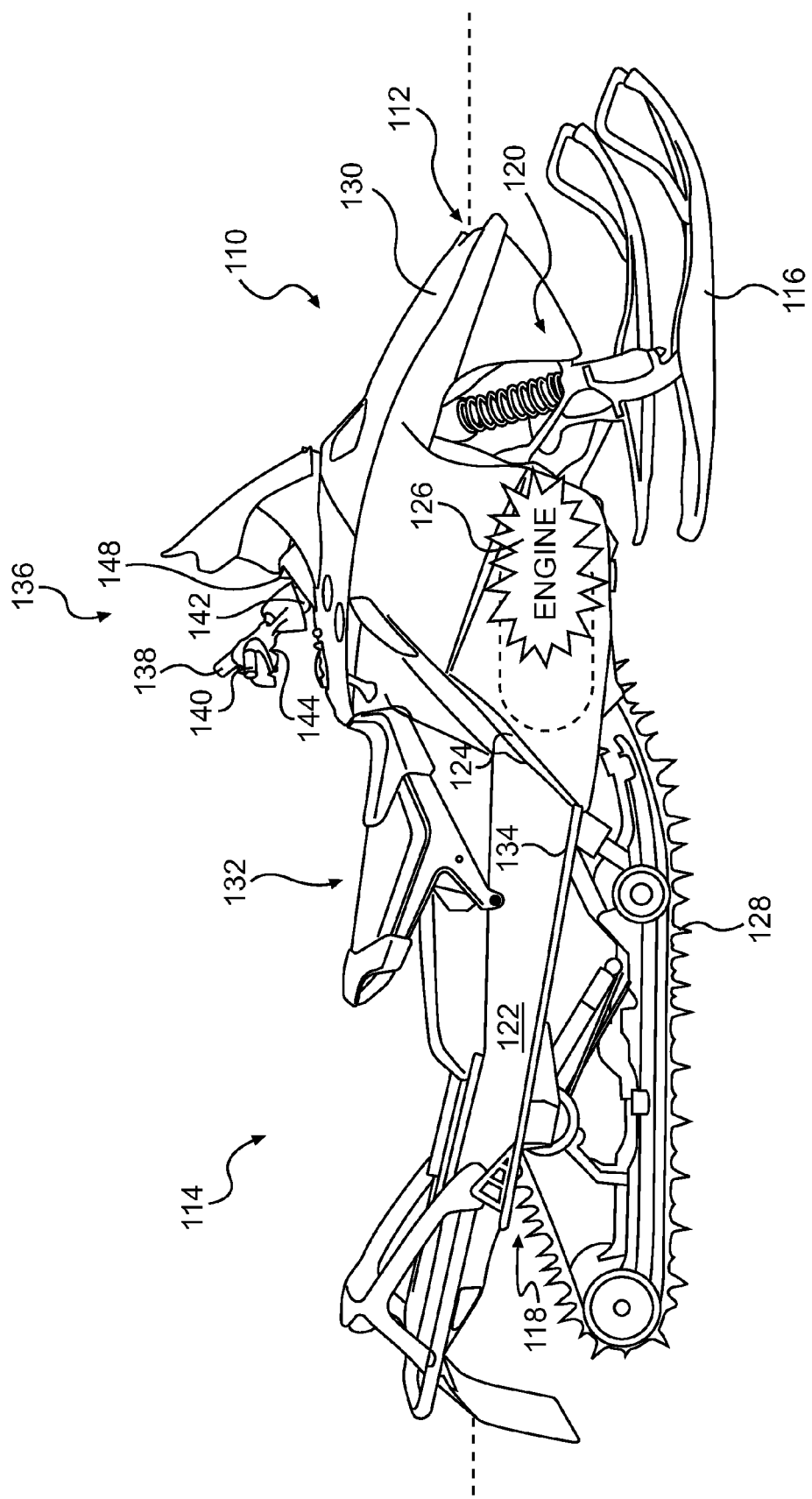
FIG. 2 is a right side elevation view of a snowmobile.

FIG. 2 shows a side elevation view of a snowmobile 110 having a forward end 112 and a rearward end 114. The snowmobile 110 has two laterally spaced skis 116, each mounted on the frame 118 via a suspension 120 in a known manner. The frame 118 includes a tunnel portion 122 and an engine compartment 124 forward of the tunnel portion 122. The tunnel portion 122 generally includes one or more pieces of sheet metal bent into an inverted U-shape. The snowmobile 110 also has an engine 126 (shown schematically) carried by the engine compartment 124. The engine 126, via a transmission (not shown), powers a rear track 218 disposed within the tunnel portion 122 to propel the vehicle. The operation of the engine 126 is controlled by an electronic control unit (ECU) (not shown). The vehicle frame 118 supports a number of fairings 130 which provide aesthetic appeal and protect the rider from dirt and snow that may be lifted by the track 128 while the snowmobile 110 is in use.

A straddle seat 132 mounted on the frame provides a seating position for a rider. The snowmobile 110 may alternatively have additional seating positions for one or two passengers. A pair of footrests 134 are provided below the seat 132 for the rider to rest his feet thereon.

A handlebar 136 is provided generally forward of the seat 132. The handlebar 136 has a left hand grip 138 and a right hand grip 140 that can be gripped by the rider. The hand grips 138, 140 are connected to a steering column 142. The steering column 142 is connected to the front skis 116 in a known manner, such that turning the hand grips 138, 140 turns the skis 116 to steer the snowmobile 110. A brake actuator, in the form of a hand brake lever 144, is provided near the right hand grip 140 for braking the snowmobile 110 in a known manner. A display cluster 148 is provided forward of the seat 132.

Figure 3:
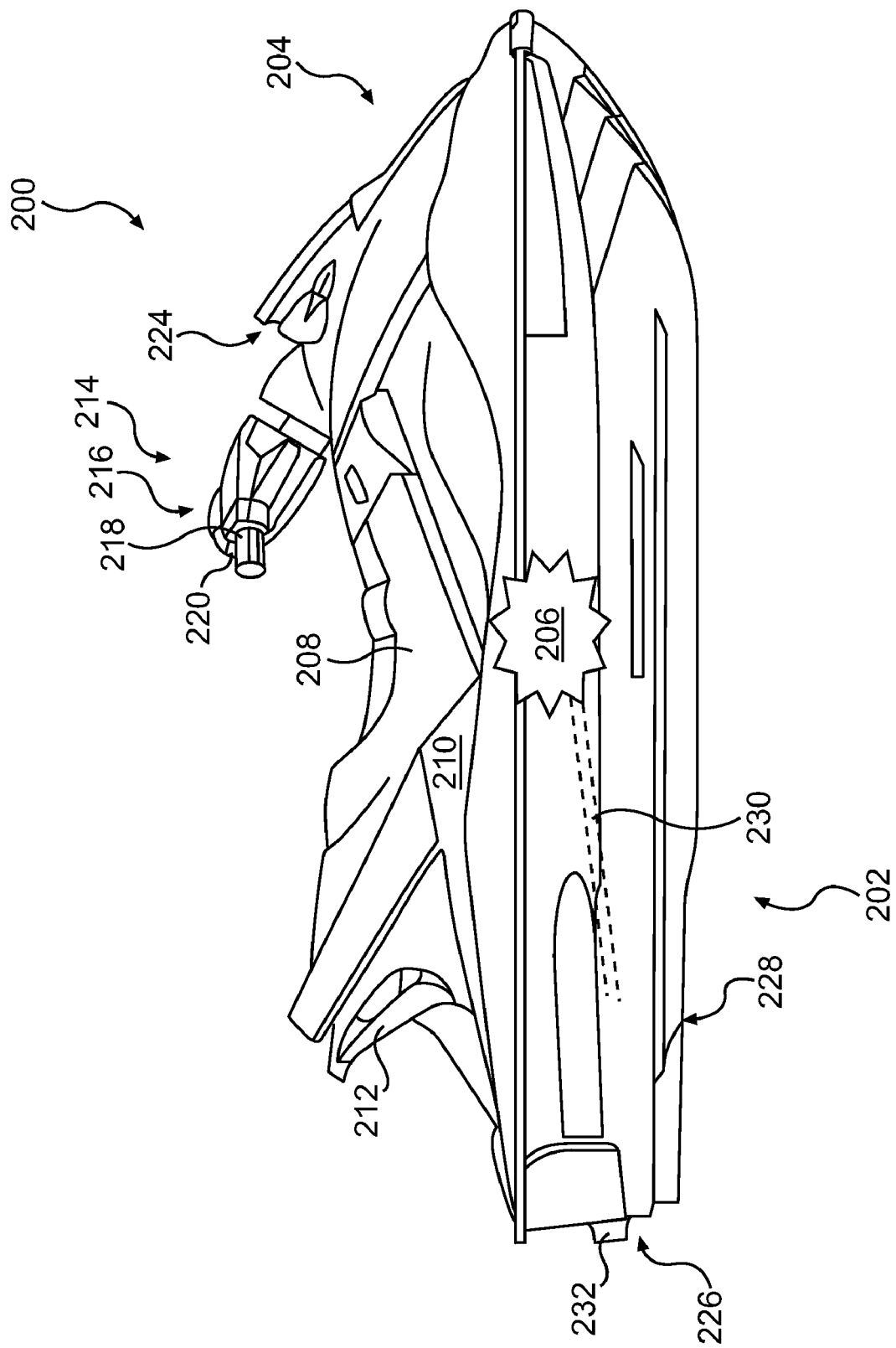
FIG. 3 is a right side elevation view of a personal watercraft.

FIG. 3 shows a side elevation view of a personal watercraft 200 having a vehicle body made of a hull 202 and a deck 204. The hull 202 buoyantly supports the watercraft 200 in the water, and the deck 204 is designed to accommodate a rider and passengers. The volume created between the hull 202 and the deck 204 is known as the engine compartment. The engine compartment accommodates the engine 206 (shown schematically) as well as the exhaust system, gas tank, electrical system (battery, ECU . . . ), air box, storage bins (not shown) and other elements required or desired for the watercraft 200.

The deck 204 has mounted thereon a straddle seat 208 placed on top of a pedestal 210 to accommodate a rider in a straddling position. A grab handle 212 is provided between the pedestal 210 and the seat 208 at the rear of the seat 208 to be gripped by a passenger.

A handlebar 214 is positioned generally forward of the seat 208. The handlebar 214 has a hand grip assembly receiving portion 216, that may be padded, and a pair of hand grips 218. One of the hand grips 218 is provided with a throttle operator in the form of a thumb-actuated throttle lever 220. Other types of throttle operators, such as a finger-actuated throttle lever and a twist grip, are also contemplated. A display cluster 224 is located forwardly of the handlebar 214 for displaying information to the rider.

The watercraft 200 is propelled by a jet propulsion system 226 including a jet pump (not shown). It is contemplated that other types of propulsion system, such as propellers, could be used. The jet propulsion system 226 pressurizes water and accelerates it to create thrust. The water is first scooped from under the hull 202 through an inlet grate 228. The inlet grate 228 prevents large rocks, weeds, and other debris from entering the jet propulsion system 226 since they may damage it or negatively affect its performance. Water then flows through the water intake ramp (not shown). From the intake ramp, water then enters the jet pump. The jet pump is made of two main parts: the impeller (not shown) and the stator (not shown). The impeller is coupled to the engine 206 by one or more shafts 230, such as a driveshaft and an impeller shaft. The rotation of the impeller pressurizes the water, which then moves over the stator that is made of a plurality of fixed stator blades (not shown). The role of the stator blades is to decrease the rotational motion of the water so that almost all the energy given to the water is used for thrust, as opposed to swirling the water. Once the water leaves the jet pump, it goes through the venturi (not shown). Since the venturi's exit diameter is smaller than its entrance diameter, the water is accelerated further, thereby providing more thrust. A steering nozzle 232 is pivotally attached to the venturi through a vertical pivot point. The steering nozzle 232 is operatively connected to the handlebar 214 via a push-pull cable (not shown) such that when the handlebar 214 is turned, the steering nozzle 232 pivots, redirects the water coming from the venturi, so as to steer the watercraft 200 in the desired direction.

Figure 4:
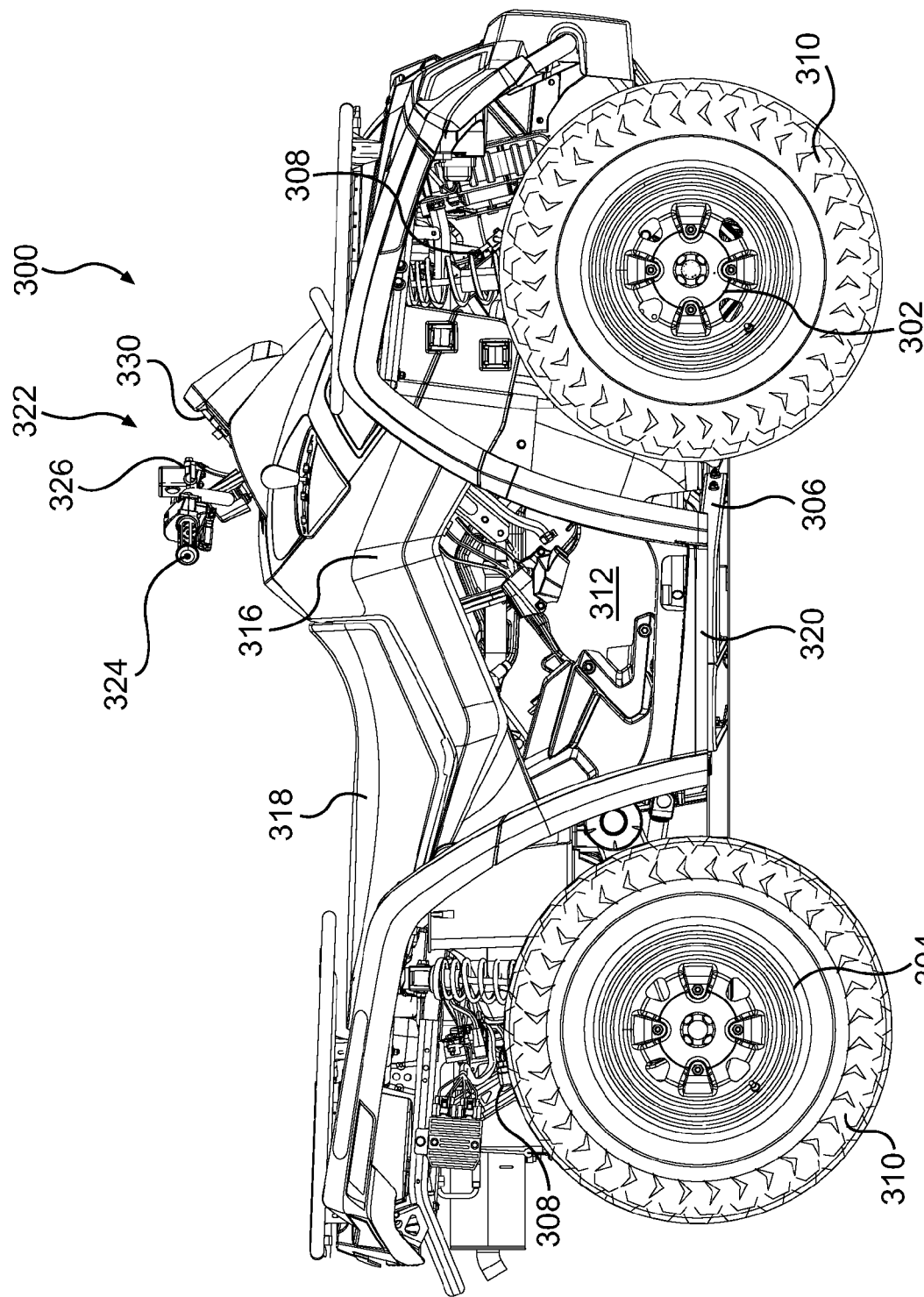
FIG. 4 is a right side elevation view of an ATV.

FIG. 4 shows a side elevation view of an ATV 300 having two laterally spaced front wheels 302 and two laterally spaced rear wheels 304, each mounted on the frame 306 via a suspension 308 in a known manner. Each of the front wheels 302 and the rear wheels 304 has mounted thereon a low-pressure balloon tire. The front wheels are each provided with a brake (not shown) for braking the ATV 300 in a known manner. The rear wheels 304 are powered by an engine 312 (shown schematically) via a transmission (not shown) to propel the ATV 300. The operation of the engine 312 is controlled by an ECU (not shown). The frame 306 supports a number of fairings 316 which provide aesthetic appeal and protect the rider from dirt and water that may be lifted by the tires while the vehicle is in use.

A straddle seat 318 mounted on the frame 306 provides a seating position for a rider. The ATV 300 may also have a second seating position for a passenger. A pair of footrests 320 is provided below the seat 318 for the rider to rest his feet thereon.

A handlebar 322 is provided generally forward of the seat 318. The handlebar 322 has a pair of hand grips 324 that can be gripped by a rider. The hand grips 324 are connected to a steering column 326. The handlebar 322 is connected to the front wheels 302 in a known manner, such that turning the handlebar 322 turns the front wheels 302 to steer the ATV 300. A display cluster 330 is provided forward of the seat 318.

Figure 5:
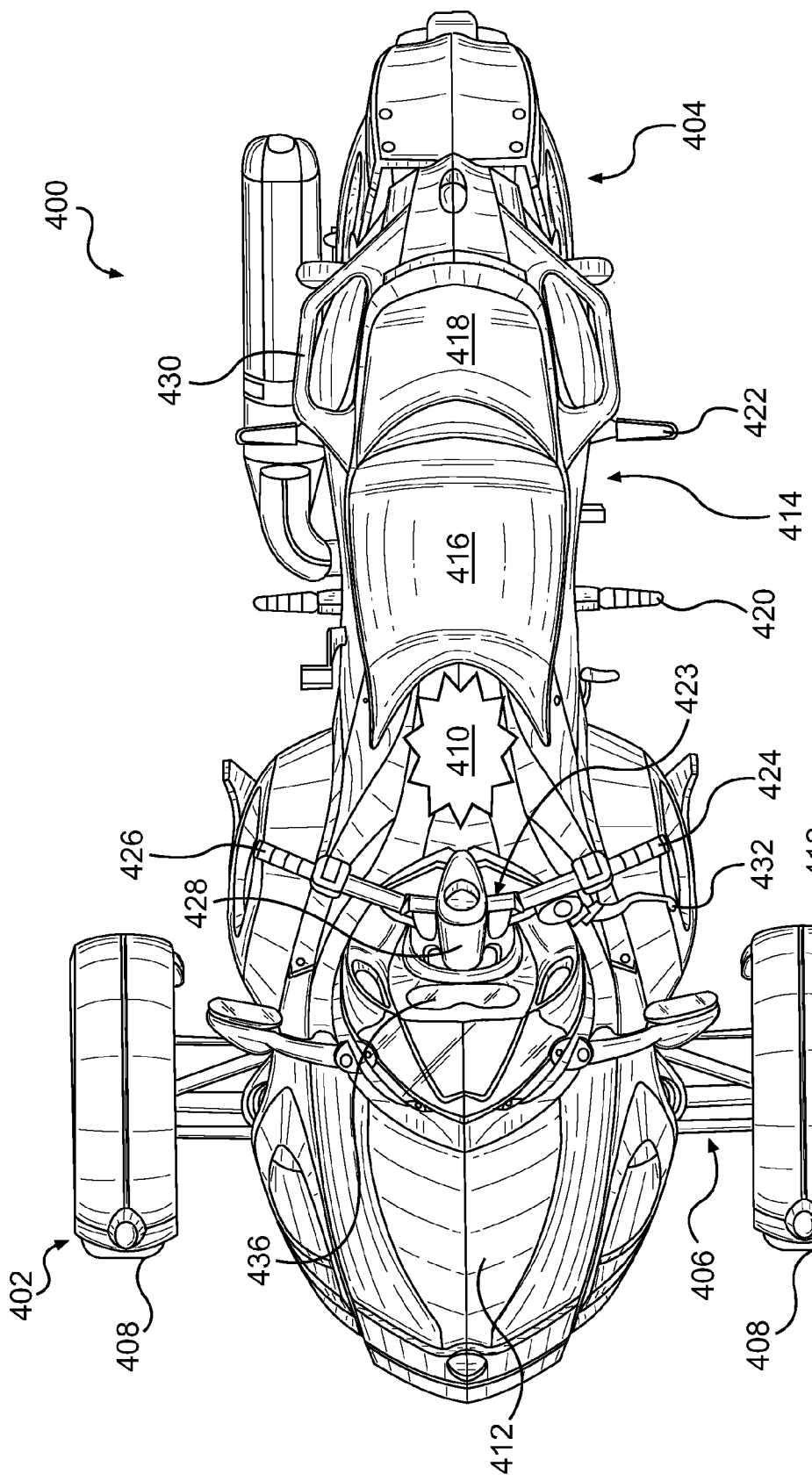
FIG. 5 is a top plan view of a three-wheeled motorized vehicle.
Figure 6:
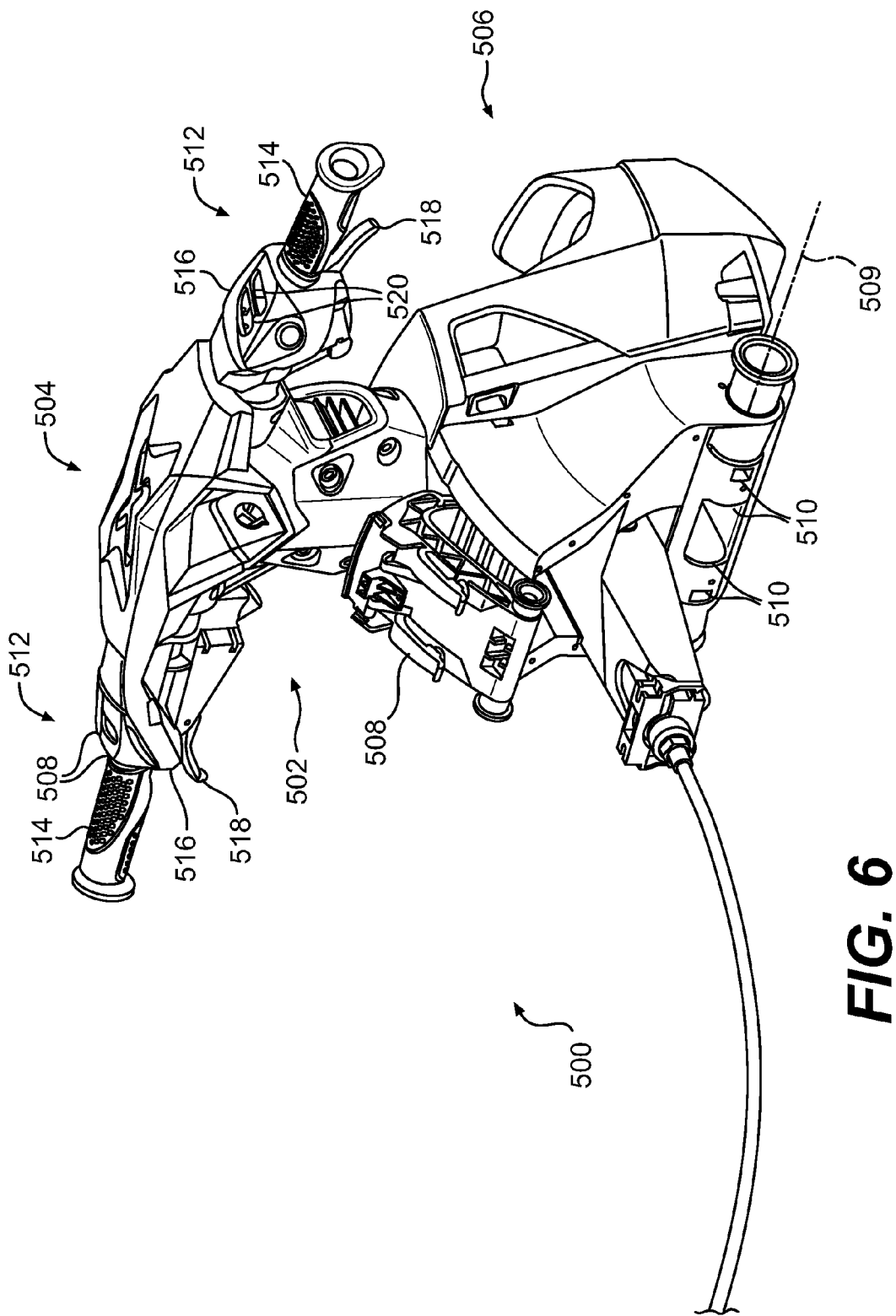
FIG. 6 is a rear, right perspective view of a steering assembly according to a first embodiment.

FIG. 5 shows a top view of a three-wheeled motorized vehicle 400. having two laterally spaced front wheels 402 and a single rear wheel 404, each mounted on the frame (not shown) via a suspension 406 in a known manner. Each of the front wheels 402 and the rear wheel 404 has mounted thereon a tire 408 suitable for road use. It is contemplated that the rear wheel 404 may have two or more tires disposed next to each other mounted thereon and still be considered a single wheel. The front and rear wheels 402, 404 are each provided with a brake (not shown). The rear wheel 404 is powered by an engine 410 (shown schematically) via a transmission (not shown) to propel the vehicle 400. The operation of the engine 410 is controlled by an ECU (not shown). The vehicle frame supports a number of fairings 412 which provide aesthetic appeal and protect the rider from dirt and water that may be lifted by the tires 408 while the vehicle is in use.

A straddle seat 414 mounted on the frame provides a first seating position 416 for a rider, and a second seating position 418 for a passenger. The vehicle 400 may alternatively have only a single seating position 416 for the rider. A pair of grab handles 430 is provided to be gripped by the passenger. A pair of rider foot pegs 420 and a pair of passenger foot pegs 422 are provided below the seat 414 for the rider and passenger, respectively, to rest their feet thereon.

A handlebar 423 is provided generally forward of the seat 414. The handlebar 423 has a left hand grip 424 and a right hand grip 426 that can be gripped by a rider. The hand grips 424, 426 are connected to a steering column 428. The handlebar 423 is connected to the front wheels 402 in a known manner, such that turning the hand grips 424, 426 turns the wheels 402 to steer the vehicle 400. A brake actuator, in the form of a hand brake lever 432, is provided near the left hand grip 424 for braking the vehicle 400. A display cluster 436 is provided forward of the seat 414, for displaying information to the rider.

Referring now to FIGS. 6-11, various embodiments of handlebars will be described. It should be understood that the handlebars described below could be used as a handlebar (i.e. handlebar 136, 214, 322, or 423) on any one of the vehicles described above.

Referring to FIGS. 6-9C, a handlebar 500, according to a first embodiment, includes a hand grip assembly receiving portion 502 having a central hub 504 mounted to the vehicle via a base 506. A releasable latch 508 allows the portion 502 to pivot with respect to the base 506 about a transverse axis 509. In this embodiment, the hub 504 pivots to a number of predetermined orientations in which the latch 508 is received in one of the recesses 510, allowing a maximum of 36° of rotation. Left and right hand grip assemblies 512, each having a hand grip 514, are received in the hub 504 in a manner that will be described below in further detail. In this embodiment, a housing 516 mounted on each hand grip assembly 514 has controllers including a lever 518 and buttons 520 for controlling aspects of the operation of the vehicle. The aspects of the vehicle controlled by the lever 518 and buttons 520 depend on the particular vehicle, but may include throttle, braking, reverse gear actuation, gear shifting, the display cluster, and starting and stopping the vehicle. The controllers are positioned relative to the hand grips 514 so that the driver of the vehicle can conveniently operate the controllers with his thumb or other fingers without removing his hands from the hand grips 514. It is contemplated that more or fewer controllers, or controllers of different, types may be provided. It is further contemplated that the controllers may alternatively control different operations. It is further contemplated that the controllers or parts thereof may be omitted, in which case the necessary controllers for operating the vehicle would be provided elsewhere on the vehicle, for example in the form of pedals within reach of the driver's feet. Each hand grip 514 has a central longitudinal axis 522 (FIG. 7) that is generally horizontal when the vehicle is upright and steered straight.

Figure 7:
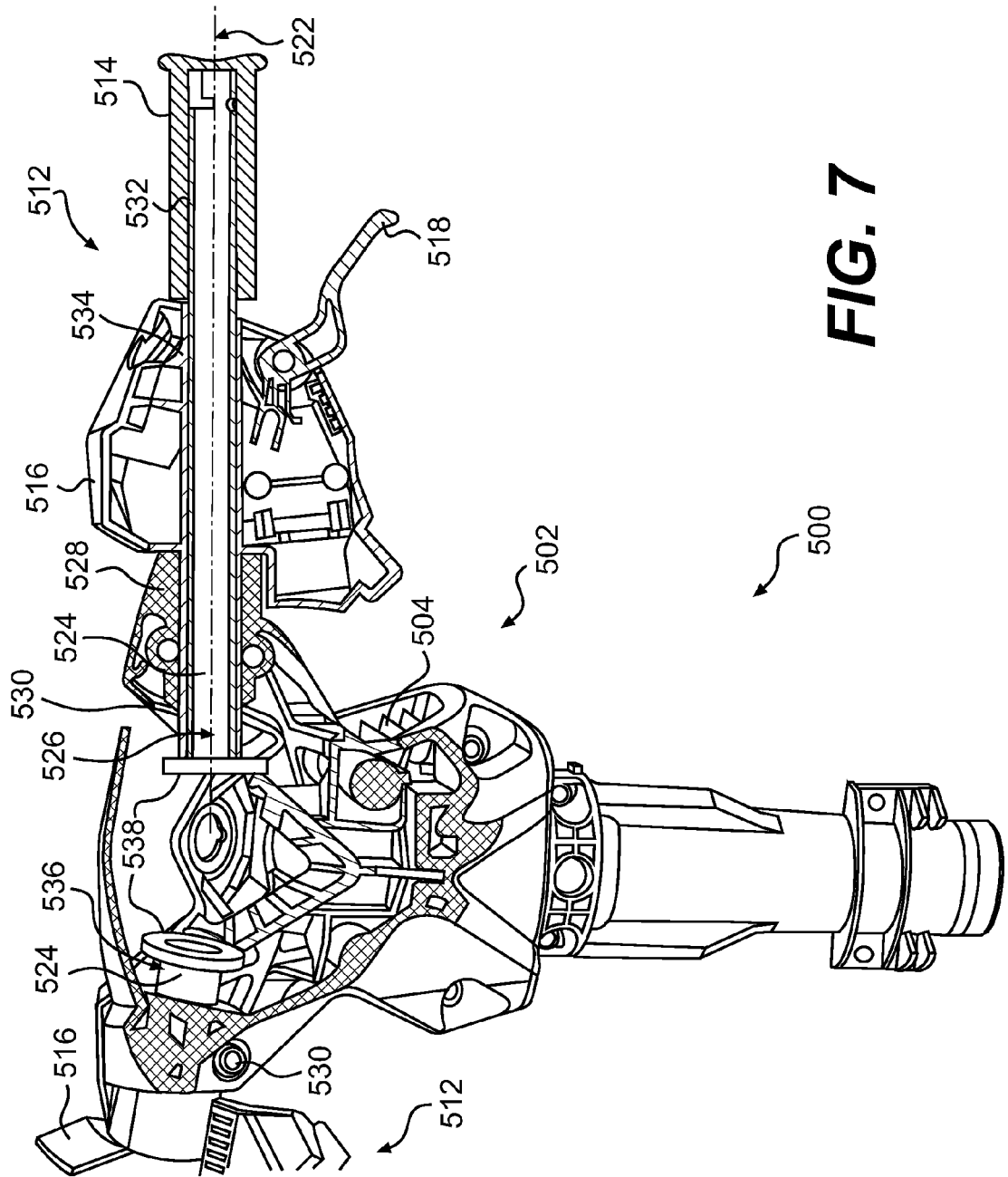
FIG. 7 is a front elevation view of the steering assembly of FIG. 6, with a portion thereof shown as a cross-section.

Referring now to FIG. 7, the left hand grip assembly 512 will be described. It should be understood that the right hand grip assembly 512 is substantially a mirror image thereof and operates in a similar manner. As such, the right hand grip assembly 512 will not be separately described.

The hand grip 514 is attached at a medial end thereof to an elongated member in the form of a generally cylindrical member 524 having a central longitudinal axis 526 oriented generally horizontally and co-axially with the axis 522 of the hand grip 514. It is contemplated that the axes 522, 526 may alternatively not be coaxial. The generally cylindrical member 524 is received in an elongated hollow member in the form of a generally cylindrical aperture 528 of the hub 504. The aperture 528 is of sufficient length to provide the necessary rigidity to the hand grip assembly 512. It is contemplated that the elongated member and the elongated hollow member could have shapes other than cylindrical. For example, it is contemplated that the elongated member could have an hexadecagonal cross-section, while the elongated hollow member could have an octagonal aperture.

Two threaded fasteners in the form of hex head bolts 530 can be tightened to constrict the size of the aperture 528 and urge the walls of the aperture 528 against the generally cylindrical member 524 to maintain the generally cylindrical member 524 fixed in position relative to the hub 504. It is contemplated that other types of releasable fasteners could be used such as, for example, screws, knobs having a threaded stud, latches, quarter turn fasteners, or other types of threaded or quick release fasteners. The bolts can be loosened to release the generally cylindrical member 524 to permit adjustments of the hand grip assembly 512 relative to the hub 504 as will be described below in further detail. The hub 504 is preferably made of aluminum or stainless steel to provide structural rigidity, but it could be made of other materials such as polymers or composite materials. The hand grip assembly 512 preferably has an aluminum, stainless steel, or steel interior 532 and a plastic layer 534 overmolded thereon. The plastic layer 534 protects the interior 532 of the generally cylindrical member 524 from scratches or abrasions due to the repeated constricting of the aperture 528 that may result in oxidation of the metal. A portion of the housing 516 may be overmolded concurrently with the plastic layer 534. It is contemplated that other suitable materials may alternatively be used.

Figure 8A:
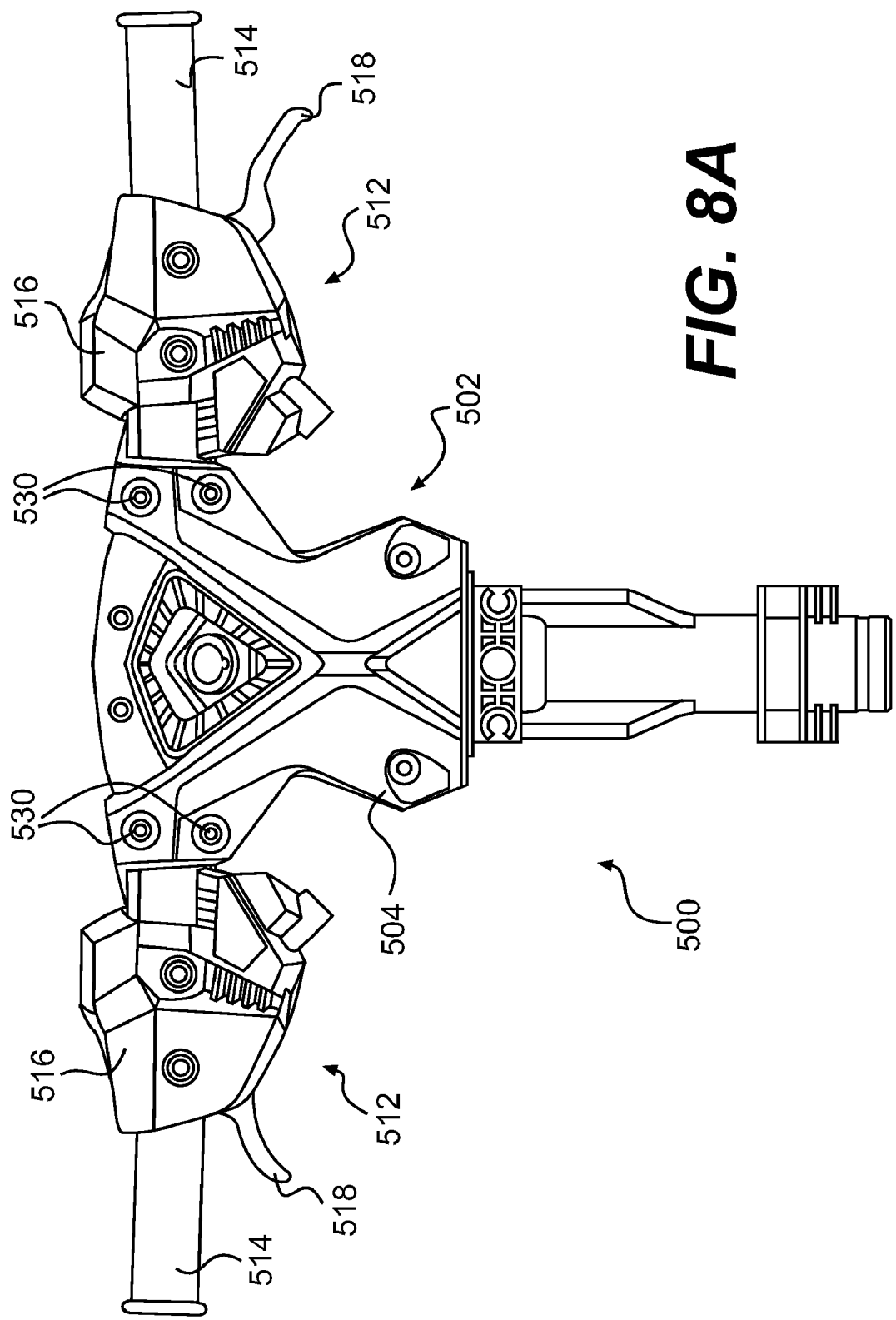

When the driver wishes to make adjustments to the hand grips 514, he first loosens the bolts 530 using a hex key (not shown) or other suitable tool. It is contemplated that any other suitable method of loosening the bolts 530 may be provided. The driver can then slide the generally cylindrical member 524 inwardly or outwardly along the axis 526 relative to the hub 504 to adjust the lateral separation of the left and right hand grips 514. An end portion 536 of the generally cylindrical member has a cap 538 of larger diameter than the generally cylindrical aperture 528. The range of motion along the axis 526 is limited when the housing 516 or the cap 538 abuts against the generally cylindrical aperture 528 or another portion of the hub 504. In one embodiment, the full range of motion of each hand grip 514 is about one inch (2.54 cm), permitting the lateral separation of the hand grips 514 to be adjusted by as much as two inches (5.08 cm). Two exemplary lateral separations of the hand grips 514 are shown in FIGS. 8A and 8B. The cap 538 additionally prevents the removal of the generally cylindrical member 524 from the generally cylindrical aperture 528. When the bolts 530 are loosened, the generally cylindrical member 524 can also be pivoted about the axis 526 relative to the hub 504 to adjust the orientation of the hand grips 514. Three exemplary orientations of the hand grips 514 are shown in FIGS. 9A, 9B and 9C. When the hand grips 514 are in the position and orientation desired by the driver, the driver tightens the bolts 530 and the hand grips 514 are maintained in a constant position and orientation relative to the hub 504.

Referring to FIGS. 10A and 10B, a handlebar 600 according to a second embodiment will be described. Features of the handlebar 600 that are similar to features of the handlebar 500 of FIG. 6-9C have been given similar numbers with different first digits, or are not shown in this embodiment, and will not be described again in detail.

In this embodiment, the generally cylindrical aperture 628 has an annular channel 640 for receiving a radial protrusion 642 disposed on the generally cylindrical member 624. It is contemplated that the generally cylindrical member 624 may alternatively have the annular channel 640, in which case the generally cylindrical aperture would have the radial protrusion 642. When the hand grip assembly 612 is pivoted about the axis 626, the protrusion 642 abuts against the sides 644, 646 of the channel 640 to define minimum and maximum orientations of the hand grip assembly 612 relative to the hub 604. The channel 640 may be dimensioned to have an arc length of 36° between the sides 644, 646 such that the available range of orientations generally corresponds to the angle through which the hub 604 may pivot about the transverse axis 609, such that the hand grips 614 may be maintained in an approximately constant orientation irrespective of the orientation of the hub 604 relative to the body of the vehicle. When the hand grip assembly 612 is moved axially along the axis 626, the protrusion 642 abuts against the sides 648, 650 of the channel 640 to define minimum and maximum lateral positions of the hand grip assembly 612 relative to the hub 604. In this manner, the channel 640 and the protrusion 642 perform a function similar to that of the cap 538 of the embodiment of FIGS. 6-9C.

An array of recesses 652 is formed in the generally cylindrical aperture 628 for receiving a protrusion 654 on the generally cylindrical member 624. As the driver changes the axial position or orientation of the hand grip assembly 612, the protrusion 654 is received in different ones of the recesses 652. Each of the recesses 652 corresponds to a predetermined discrete position and orientation of the hand grip assembly 612. When the driver adjusts the hand grip assembly 612 to any one of the predetermined positions and orientations, the protrusion 654 is received in the corresponding recess 652. This assists the driver in reliably adjusting the hand grip assemblies 612 to a particular position and orientation, and in adjusting the left and right hand grip assemblies 612 to the same position and orientation to obtain a symmetric arrangement. The driver may then fix both hand grip assemblies 612 in position by tightening the bolts 630. In this embodiment, the protrusion 654 is mounted on a resilient strip of material 656 inside the generally cylindrical portion 624. When the driver adjusts the hand grip assembly 612, the protrusion 654 is displaced radially inwardly against the biasing force of the strip of material 656 until the protrusion 654 aligns with another one of the recesses 652. It is contemplated that the protrusion 654 may alternatively be made of a resilient material such that the protrusion deforms when it is not aligned with a recess 652. It is further contemplated that the recesses 652 may alternatively be formed in the generally cylindrical member 624, in which case the protrusion 654 would be formed in the generally cylindrical aperture 628. It is also contemplated one of the generally cylindrical member 624 and the generally cylindrical aperture 628 could be provided with an array of protrusions while the other one of the generally cylindrical member 624 and the generally cylindrical aperture 628 would be provided with a recess.

Figure 11:
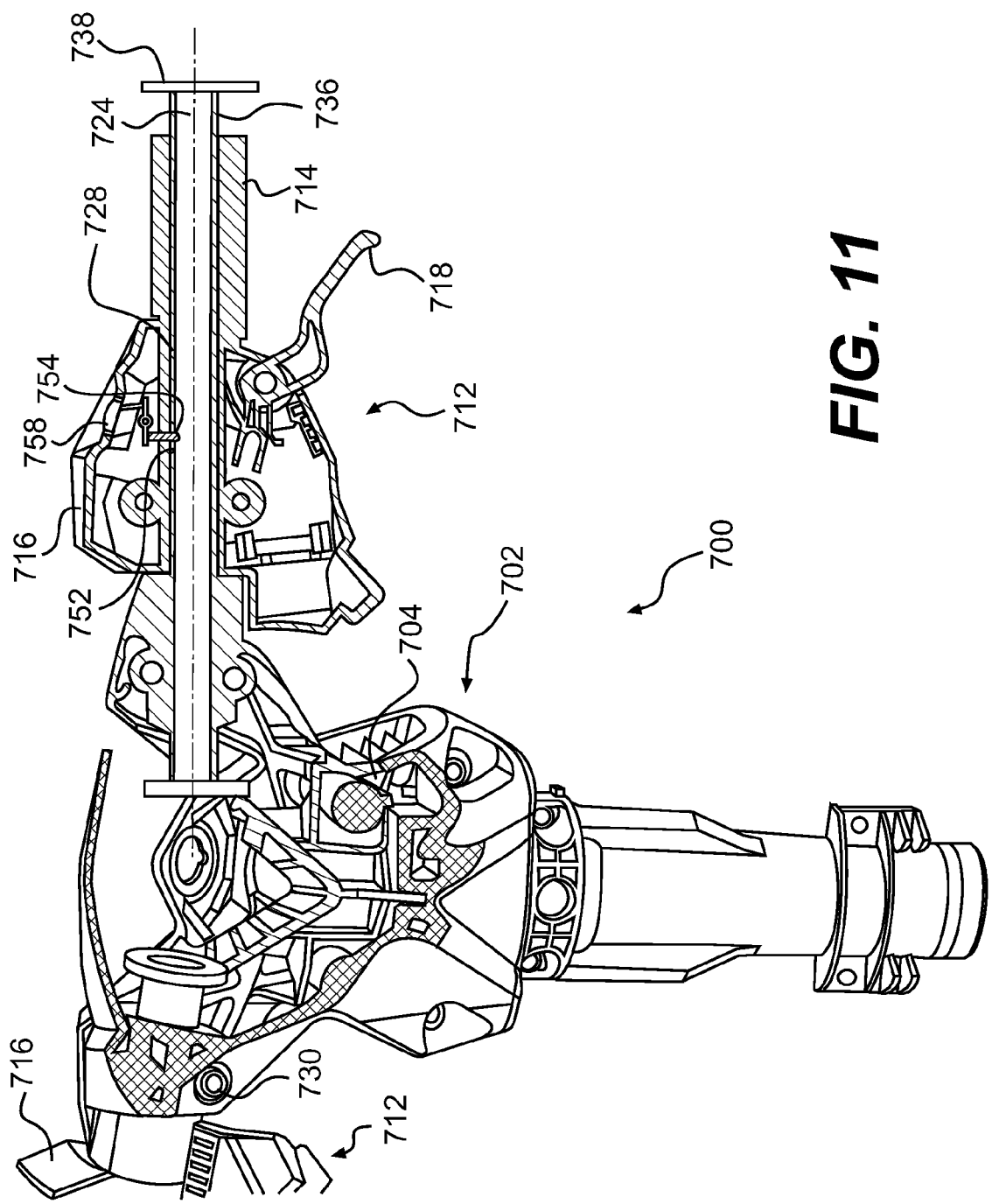
FIG. 11 is a front elevation view of a steering assembly according to a third embodiment, with a portion thereof shown as a cross-section.

Referring to FIG. 11, a handlebar 700 will be described according to a third embodiment. Features of the handlebar 700 that are similar to features of the handlebar 500 of FIGS. 6-9C or the handlebar 600 of FIGS. 10A and 10B have been given similar numbers with different first digits, or are not shown in this embodiment, and will not be described again in detail.

In this embodiment, the hand grip assembly 712 comprises a hand grip 714, a housing 716, and a generally cylindrical aperture 728. The hub 704 has a generally cylindrical member 724 with a cap 738 at an end portion 736 thereof. The hand grip assembly 712 is movable relative to the hub 704 between a plurality of predetermined positions and orientations in which the protrusion 754 in the generally cylindrical aperture 728 aligns with one of the plurality of depressions 752 (only one of which is shown) in the generally cylindrical member 724. A release actuator in the form of a button 758 is provided for selectively disengaging the protrusion 754 from the depression 752 to allow adjustment of the hand grip assembly 712. It is contemplated that the release actuator 754 could be constructed so as to render the need of other releasable fasteners (such as the bolts 530 described above) unnecessary.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A vehicle comprising:
   a vehicle body;
   a straddle-type seat disposed on the vehicle body; and
   a steering device supported by the vehicle body and being disposed generally forwardly of the seat for steering the vehicle, the steering device having a left side and a right side, each side having:
      a hand grip assembly receiving portion having one of an elongated hollow member and an elongated member;
      a hand grip assembly having:
         the other of the elongated hollow member and the elongated member; and
         a hand grip disposed on the other of the elongated hollow member and the elongated member; and
      at least one releasable fastener disposed on one of the elongated hollow member and the elongated member,
      the elongated member being received coaxially in the elongated hollow member, a common central longitudinal axis of the elongated member and the elongated hollow member being oriented generally horizontally when the vehicle is upright, stationary and steered straight,
      one of the elongated hollow member and the elongated member having a radially protruding portion protruding radially toward the other of the elongated hollow member and the elongated member,
      the hand grip being axially movable relative to the hand grip assembly receiving portion along the central longitudinal axis by moving the elongated member axially relative to the elongated hollow member along the central longitudinal axis between a plurality of axial positions, the radially protruding portion of the one of the elongated hollow member and the elongated member abutting a portion of the other of the elongated hollow member and the elongated member to limit an axial movement of the hand grip relative to the hand grip assembly receiving portion in a laterally outward direction,
      the hand grip being pivotable relative to the hand grip assembly receiving portion about the central longitudinal axis by pivoting the elongated member relative to the elongated hollow member about the central longitudinal axis between a plurality of orientations,
      the at least one releasable fastener being operative to selectively and releasably fix the elongated member relative to the elongated hollow member in any one of the plurality of axial positions and in any one of the plurality of orientations.

2. The vehicle of claim 1, wherein the elongated hollow member is a generally cylindrical aperture; and
   wherein the elongated member is a generally cylindrical member.

3. The vehicle of claim 2, wherein:
   the at least one releasable fastener comprises at least one threaded fastener; and
   tightening the at least one threaded fastener urges at least a portion of the generally cylindrical aperture against the generally cylindrical member, thereby preventing both axial movement and pivotal movement of the generally cylindrical member relative to the generally cylindrical aperture.

4. The vehicle of claim 2, wherein:
   the plurality of axial positions is a plurality of predetermined axial positions; and
   the plurality of orientations is a plurality of predetermined orientations.

5. The vehicle of claim 4, wherein:
   one of the generally cylindrical member and the generally cylindrical aperture further comprises at least one protrusion; and
   the other of the generally cylindrical member and the generally cylindrical aperture further comprises a plurality of recesses, each recess of the plurality of recesses corresponding to one of the plurality of predetermined axial positions and one of the plurality of predetermined orientations of the generally cylindrical member relative to the generally cylindrical aperture,
   such that when the at least one protrusion is received in at least one recess of the plurality of depressions the generally cylindrical member is in the predetermined axial position and the predetermined orientation corresponding to the at least one recess.

6. The vehicle of claim 5, wherein the at least one protrusion is movable relative to the one of the generally cylindrical member and the generally cylindrical aperture between a first position wherein the at least one protrusion is received in the at least one recess and a second position wherein the at least one protrusion is disengaged from the at least one recess,
   the at least one protrusion being biased toward the first position.

7. The vehicle of claim 6, further comprising a release actuator operatively connected to the at least one protrusion, the release actuator being operative to selectively move the at least one protrusion to the second position.

8. The vehicle of claim 2, wherein the radially protruding portion of the one of the elongated hollow member and the elongated member is a distal end portion of the generally cylindrical member having a diameter larger than the generally cylindrical aperture, thereby limiting an axial movement of the generally cylindrical member relative to the generally cylindrical aperture in the laterally outward direction.

9. The vehicle of claim 2, wherein the steering device is further pivotably connected to the vehicle body about a horizontal axis, the horizontal axis being disposed below the left and right hand grip assemblies when the vehicle is upright, stationary and steered straight.

10. The vehicle of claim 9, wherein:
    the radially protruding portion of the one of the elongated hollow member and the elongated member is a radial protrusion;
    one of the generally cylindrical member and the generally cylindrical aperture has an annular channel formed therein, the annular channel having a first end and a second end defining a length of the channel therebetween; and
    the other of the generally cylindrical member and the generally cylindrical aperture has the radial protrusion, the radial protrusion being received in the annular channel, the radial protrusion abutting against the first and second ends of the annular channel to define respective minimal and maximal orientations of the generally cylindrical member relative to the generally cylindrical aperture about the central longitudinal axis.

11. The vehicle of claim 10, wherein the length of the channel is selected such that an angular difference between the minimal and maximal orientations of the generally cylindrical member relative to the generally cylindrical aperture generally corresponds to a maximum angle of rotation of the steering device relative to the vehicle body about the horizontal axis.

12. The vehicle of claim 1, wherein at least one hand grip assembly of the left and right hand grip assemblies comprises at least one controller disposed thereon, the at least one controller being operatively connected to the vehicle for controlling an operation of the vehicle; and
   wherein the at least one controller is axially movable and pivotable with the at least one hand grip relative to the hand grip assembly receiving portion.

13. An adjustable handlebar assembly comprising:
   a left side and a right side, each side having:
   a hand grip assembly receiving portion having one of an elongated hollow member and an elongated member;
   a hand grip assembly having:
      the other of the elongated hollow member and the elongated member; and
      a hand grip disposed on the other of the elongated hollow member and the elongated member; and
   at least one releasable fastener disposed on one of the elongated hollow member and the elongated member,
   the elongated member being received coaxially in the elongated hollow member, a common central longitudinal axis of the elongated member and the elongated hollow member being generally coaxial with an axis of the hand grip assembly,
   one of the elongated hollow member and the elongated member having a radially protruding portion protruding radially toward the other of the elongated hollow member and the elongated member,
   the hand grip being axially movable relative to the hand grip assembly receiving portion along the central longitudinal axis by moving the elongated member axially relative to the elongated hollow member along the central longitudinal axis between a plurality of axial positions, the radially protruding portion of the one of the elongated hollow member and the elongated member abutting a portion of the other of the elongated hollow member and the elongated member to limit an axial movement of the hand rip relative to the hand grip assembly receiving portion in a laterally outward direction,
   the hand grip being pivotable relative to the hand grip assembly receiving portion about the central longitudinal axis by pivoting the elongated member relative to the elongated hollow member about the central longitudinal axis between a plurality of orientations,
   the at least one releasable fastener being operative to selectively and releasably fix the elongated member relative to the elongated hollow member in any one of the plurality of axial positions and in any one of the plurality of orientations.

14. The adjustable handlebar of claim 13, wherein the elongated hollow member is a generally cylindrical aperture; and
   wherein the elongated member is a generally cylindrical member.

15. The adjustable handlebar of claim 14, wherein:
   the at least one releasable fastener comprises at least one threaded fastener; and
   tightening the at least one threaded fastener urges at least a portion of the generally cylindrical aperture against the generally cylindrical member, thereby preventing both axial movement and pivotal movement of the generally cylindrical member relative to the generally cylindrical aperture.

16. The adjustable handlebar of claim 14, wherein:
   the plurality of axial positions is a plurality of predetermined axial positions; and
   the plurality of orientations is a plurality of predetermined orientations.

17. The adjustable handlebar of claim 16, wherein:
   one of the generally cylindrical member and the generally cylindrical aperture further comprises at least one protrusion; and
   the other of the generally cylindrical member and the generally cylindrical aperture further comprises a plurality of recesses, each recess of the plurality of recesses corresponding to one of the plurality of predetermined axial positions and one of the plurality of predetermined orientations of the generally cylindrical member relative to the generally cylindrical aperture,
   such that when the at least one protrusion is received in at least one recess of the plurality of depressions the generally cylindrical member is in the predetermined axial position and the predetermined orientation corresponding to the at least one recess.

18. The adjustable handlebar of claim 17, wherein the at least one protrusion is movable relative to the one of the generally cylindrical member and the generally cylindrical aperture between a first position wherein the at least one protrusion is received in the at least one recess and a second position wherein the at least one protrusion is disengaged from the at least one recess,
   the at least one protrusion being biased toward the first position.

19. The adjustable handlebar of claim 18, further comprising a release actuator operatively connected to the at least one protrusion, the release actuator being operative to selectively move the at least one protrusion to the second position.

20. The adjustable handlebar of claim 14, wherein the radially protruding portion of the one of the elongated hollow member and the elongated member is a distal end portion of the generally cylindrical member having a diameter larger than the generally cylindrical aperture, thereby limiting an axial movement of the generally cylindrical member relative to the generally cylindrical aperture in the laterally outward direction.

21. The adjustable handlebar of claim 14, wherein:
   the radially protruding portion of the one of the elongated hollow member and the elongated member is a radial protrusion;
   one of the generally cylindrical member and the generally cylindrical aperture has an annular channel formed therein, the annular channel having a first end and a second end defining a length of the channel therebetween; and
   the other of the generally cylindrical member and the generally cylindrical aperture has the radial protrusion, the radial protrusion being received in the annular channel, the radial protrusion abutting against the first and second ends of the annular channel to define respective minimal and maximal orientations of the generally cylindrical member relative to the generally cylindrical aperture about the central longitudinal axis.

22. The adjustable handlebar of claim 14, wherein at least one hand grip assembly of the left and right hand grip assemblies comprises at least one controller disposed thereon, the at least one controller being operatively connectable to a vehicle for controlling an operation of the vehicle; and
   wherein the at least one controller is axially movable and pivotable with the at least one hand grip relative to the hand grip assembly receiving portion.

* * * * *